UNITED STATES PATENT OFFICE.

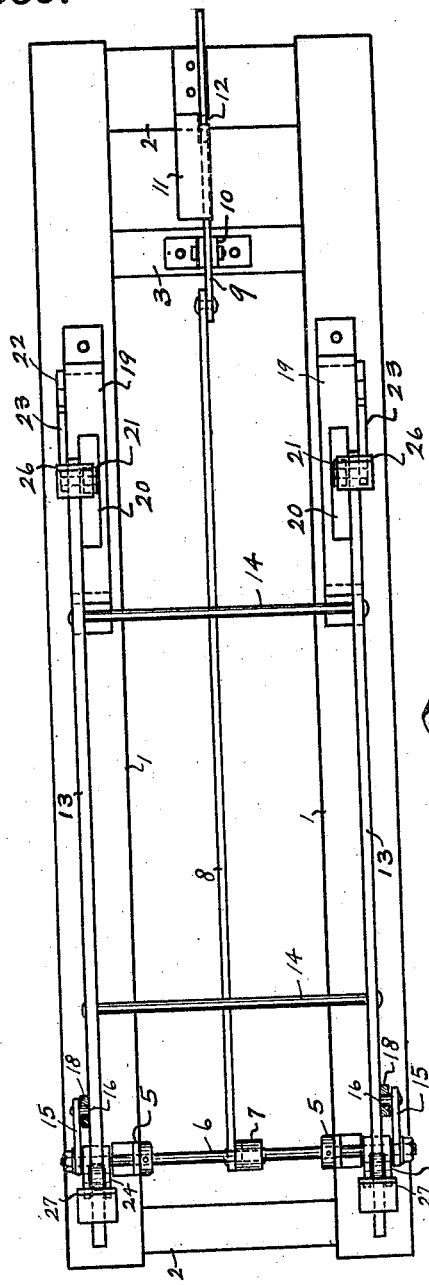

JOHN G. BOUTTE, OF HOUSTON, TEXAS.

VEHICLE-HOIST.

1,398,959.   Specification of Letters Patent.   Patented Dec. 6, 1921.

Application filed January 22, 1921. Serial No. 439,104.

*To all whom it may concern:*

Be it known that I, JOHN G. BOUTTE, a citizen of the United States, residing at Houston, in the county of Harris and State of Texas, have invented certain new and useful Improvements in a Vehicle-Hoist, of which the following is a specification.

This invention relates to new and useful improvements in a vehicle hoist.

One object of the invention is to provide a device of the character described which has been specially designed for the purpose of lifting motor vehicles so that their wheels will clear the ground or garage floor.

Another object of the invention is to provide a device of the character described which is so constructed that it will be operated automatically by the momentum of the vehicle and will lift said vehicle so that said vehicle will be entirely sustained thereby, thus relieving the tires from the strain of the weight of the vehicle.

Another object of the invention is to provide a hoist of the character described which is of simple construction and may be easily manufactured and is adapted for use in public or private garages or wherever it may be desired to store a vehicle having pneumatic tires.

A further feature of the invention resides in the provision of a hoist whereby the car carried thereby may be readily lowered and driven from said hoist.

With the above and other objects in view the invention has particular relation to certain novel features of construction, operation and arrangement of parts, an example of which is given in this specification and illustrated in the accompanying drawings, wherein:—

Figure 1 is a plan view of the device, and Fig. 2 is a side view.

Referring now more particularly to the drawings, wherein like numerals of reference designate similar parts in each of the figures, the numerals 1, 1 refer to the side members of the supporting framework, which are connected by means of suitable end members 2, 2 and which are also connected by an intermediate cross beam 3. At one end the side members 1 are provided with the bearings 5, 5 in transverse alinement in which the shaft 6 is rotatably mounted, and this shaft has a depending arm 7 fixed thereto, to the lower end of which one end of the link 8 is pivoted. The other end of this link is pivoted to the lower end of the manual lever 9 which is pivoted to the bearing 10 upstanding from the cross beam 3. The lever 9 works adjacent an arcuate rack member 11, which is fastened to the corresponding end member 2 and which is provided with a notch 12, in which said lever 9 may be engaged. A hoisting frame is provided, consisting of the side members 13, 13, which are connected by suitable cross rods 14, 14. Each end of the shaft 6 has an arm 15 secured thereto, the free ends of which have the bearing pins 16 which work in vertical slots 17 of the depending lugs 18. These lugs are secured to the adjacent ends of the side members 13. The other ends of said side members rest upon the long bearings 19, 19, which are fastened upon the side members 1 and said bearings have inclined guides 20, along which the roller bearings 21, carried by the corresponding ends of the side members 13, travel. The outer side of each of the bearings 19 is provided with a ratchet face 22, with which the dogs 23 coöperate, said dogs being pivoted to the adjacent ends of the side members 13. Fixed to the respective ends of the shaft 6 are the bifurcated guides 24, between the fingers of which the corresponding ends of the side members 13 work, said ends of said guide members resting on the roller bearings 25, which are rotatably mounted between the fingers of said guides. The forward ends of the side members 13 have the upstanding stops 26, 26 fixed thereon and corresponding stops 27, 27 are fixed upon the rear ends of said side members.

When in inactive position the rear ends of the side members 13 are somewhat lower than the forward ends thereof so that when the vehicle is driven over the hoist the front axle will clear the stops 27, 27 but will contact against the stops 26, 26 and the momentum of the vehicle will move said front ends up the guides 20, carrying the side members 13, 13 forwardly and the arms 15 will be swung around, causing a rotation of the shaft 6, which will operate to pull the link 8 rearwardly and carry the manual lever 9 forwardly until it engages in the notch 12. At the same time the rear ends of the side members 13 are driven along the rollers 25 and are slightly elevated, and the rear axle, which is now seated against the stops 27, will be thereby elevated and all of the vehicle wheels will clear the ground or floor of the garage. The dogs 23 will at the same time engage with the ratchet faces 22 and firmly lock the hoist in elevated position. When it is desired to release the hoist the dogs 23 are disengaged from their ratchet faces and the manual lever 9 is disengaged from the notch 12 and the vehicle will then descend by its own weight until it is clear of the hoist.

What I claim is:—

1. A vehicle hoist, including a framework, a hoisting frame mounted thereon and movable lengthwise relative thereto, means for elevating the frame relative to the framework when the former is moved in one direction, means automatically locking the frame in elevated position, said means including a rack, a manual lever pivoted to the framework one end of which is in coöperative relation with said rack, a link pivoted at one end to the other end of said lever and at its other end pivotally connected to the elevating means, said elevating means being formed to permit the lowering of the frame by gravity when the locking means are released.

2. A vehicle hoist, including a framework, a hoisting frame mounted thereon and movable lengthwise relative thereto, means for elevating the frame relative to the framework when the former is moved in one direction, rack members, carried by the framework, dogs carried by the frame and engaging with said racks and automatically locking the frame in elevated position, said elevating means being formed to permit the lowering of the frame by gravity when the dogs are released, and stops carried by the frame against which the respective vehicle axles engage to move the frame into elevated position.

3. A vehicle hoist, including a framework, a hoisting frame mounted thereon, stops carried by the respective ends of said frame against which the vehicle axles contact when the vehicle moves over said hoist, an operative connection between said framework and frame, whereby the latter is elevated when moved in one direction and lowered when moved in the other direction, and a link pivoted at one end to said connection, a lever pivoted to the framework to one end of which the other end of the link is pivoted and a rack member with which said lever engages, to lock the frame in elevated position.

4. A vehicle hoist, including a framework, a hoisting frame mounted thereon, and movable relative thereto, means which are disposed to elevate the frame when moved in one direction and which permit the lowering thereof by gravity when moved in the other direction, rack members carried by the framework, dogs pivoted to the frame and engaging with the rack members to lock the frame in elevated position, a link pivoted at one end to said elevating means, a manual lever pivoted to the framework one end of which is pivoted to the other end of the link, an arcuate rack carried by the framework and with which the other end of said lever engages when the frame is in elevated position, to also secure said frame in elevated position, said lever and dogs being releasable to permit the lowering of the frame.

In testimony whereof I have signed my name to this specification in the presence of two subscribing witnesses.

JOHN G. BOUTTE.

Witnesses:
 JAS. W. OLIVER,
 E. V. HARDWAY.